US006707464B2

(12) United States Patent  
Ham et al.

(10) Patent No.: US 6,707,464 B2
(45) Date of Patent: Mar. 16, 2004

(54) SYSTEM AND METHOD FOR IDENTIFYING TIE POINT COLLECTIONS USED IN IMAGERY

(75) Inventors: Todd E. Ham, West Melbourne, FL (US); Aaron Andrews, Melbourne, FL (US); Brian Bleeze, Alexandria, VA (US)

(73) Assignee: Harris Corporation, Melbourne, FL (US)

( * ) Notice: Subject to any disclaimer, the term of this patent is extended or adjusted under 35 U.S.C. 154(b) by 399 days.

(21) Appl. No.: 09/774,537

(22) Filed: Jan. 31, 2001

(65) Prior Publication Data

US 2002/0101438 A1 Aug. 1, 2002

(51) Int. Cl.[7] .............................................. G06T 15/00
(52) U.S. Cl. ...................................................... 345/629
(58) Field of Search .............................. 345/629, 619, 345/660, 630, 671

(56) References Cited

U.S. PATENT DOCUMENTS

| 5,003,491 A | 3/1991 | Heckt ........................ 364/518 |
| 5,067,098 A | 11/1991 | Moellering et al. ......... 395/126 |
| 5,187,754 A | 2/1993 | Currin et al. ................. 382/54 |
| 5,220,441 A | 6/1993 | Gerstenberger ............. 358/487 |
| 5,299,300 A | 3/1994 | Femal et al. ................ 395/128 |
| 5,426,731 A | 6/1995 | Masukane et al. .......... 395/162 |
| 5,496,106 A | 3/1996 | Anderson ................... 348/255 |
| 5,541,653 A | 7/1996 | Peters et al. ................ 348/264 |
| 5,552,787 A | 9/1996 | Schuler et al. ............... 342/25 |
| 5,572,235 A | 11/1996 | Mical et al. ................. 345/150 |
| 5,699,318 A | 12/1997 | Fischer ........................ 367/88 |
| 5,715,334 A | 2/1998 | Peters ......................... 382/254 |
| 5,808,626 A | 9/1998 | Givens et al. .............. 345/440 |
| 6,009,359 A | 12/1999 | El-Hakim et al. ............ 701/28 |
| 6,583,792 B1 * | 6/2003 | Agnew ....................... 345/660 |

* cited by examiner

Primary Examiner—Phu K. Nguyen
(74) Attorney, Agent, or Firm—Allen, Dyer, Doppelt, Milbrath & Gilchrist, P.A.

(57) ABSTRACT

A system and method of the present invention identifies tie point collections used in imagery. At least one image collection device acquires images of a selected geographic or other region. A processor is operatively connected to the at least one image collection device and combines the acquired images into respective stereo images such that only the stereo overlap remains. The stereo images can be overlay combined and color coded at the overlapped image areas based on the number of overlapping stereo images to produce a colored overlay image to assist in triangulation and optimal texture selection.

44 Claims, 7 Drawing Sheets

Simple Case: Overlaps 1+2

FIG. 1.

Intermediate Case:
Two Way: 1+2,2+3,3+4,4+5,5+6,1+3,1+4,2+4,2+5,2+6,3+5,3+6,4+6
Three way: 1+3+4,1+2+3,3+4+6,3+5+6, etc.
Four-way: 1+2+3+4,3+5+6+2, etc.

Sample Atlanta Image Mosaic

SYSTEM AND METHOD FOR IDENTIFYING TIE POINT COLLECTIONS USED IN IMAGERY

FIELD OF THE INVENTION

This invention relates to imaging systems, and more particularly, this invention relates to a system and method for identifying tie point collections for imagery.

BACKGROUND OF THE INVENTION

The triangulation, i.e., the registration and control of satellite and aerial imagery, requires that the area of image overlap be correctly identified to ensure proper tie point collection. As is known, tie points are registered points of correspondence among various images, which can range in size and scale. For example, if an aircraft acquires images of a specific region at 5,500 feet, and then acquires images of the same region at 6,000 feet, the images will not be to scale and could differ as to cloud cover or other details.

Determining the areas of image overlap can be geographically challenging and time consuming if there are many image collections. This problem is further complicated when the tie points must be generated between stereo overlap areas.

In one prior art imaging technique, footprint polygons are used to identify the geographic extent of each individual image. A user, or the imaging processor, is then responsible for identifying the area of overlap. This task is easy for simple cases, but very difficult for complex overlap conditions.

Figure 1:
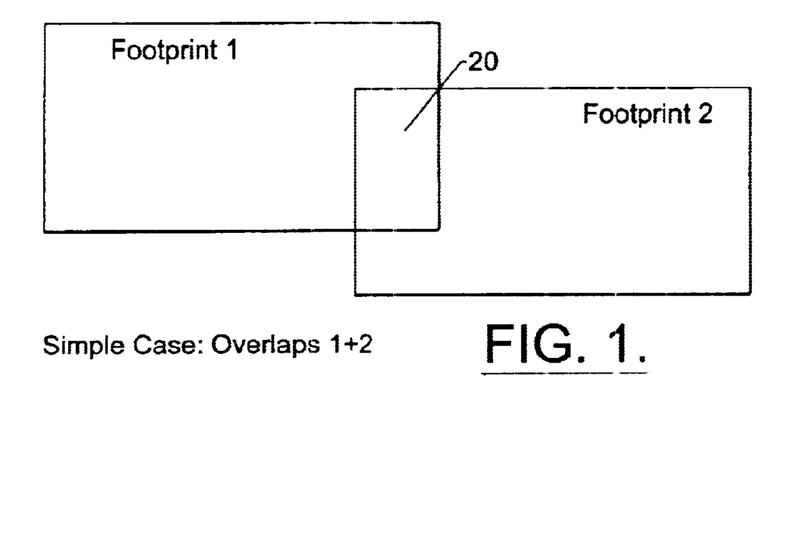
FIGS. 1 and 2 are drawings that illustrate respective simple and intermediate overlap cases using footprint polygons.
Figure 2:
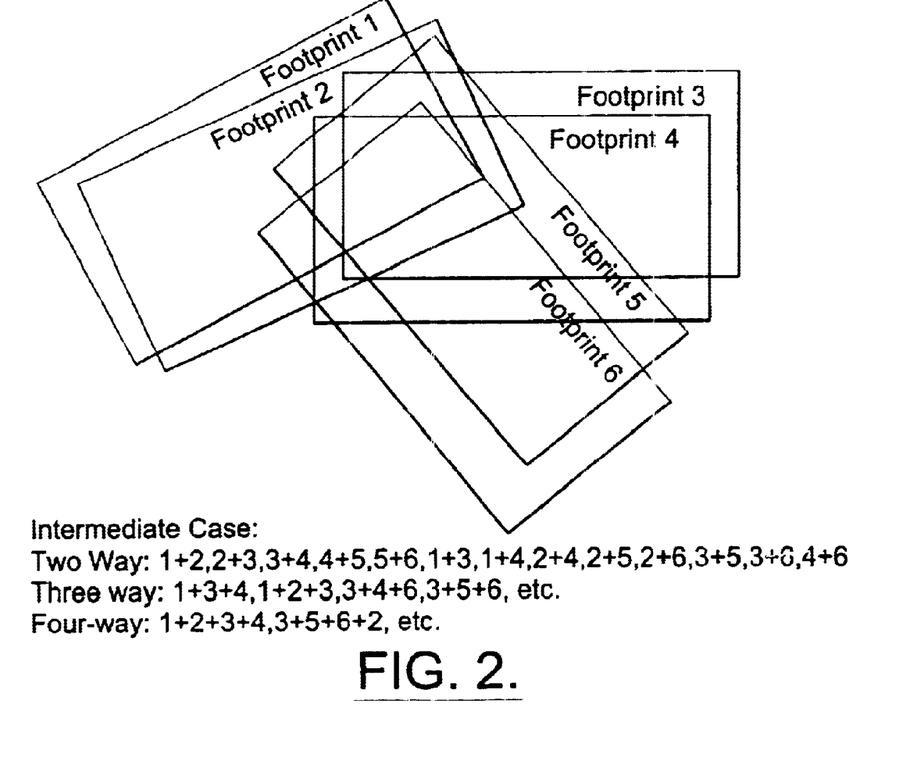

FIG. 1 illustrates a simple image case where image footprint 1 and image footprint 2 have a single overlap 20. This area of overlap is not difficult to distinguish and process in most imaging systems. An intermediate, complex case is shown in FIG. 2 where image footprints 1–6 create two-way, three-way and four-way overlaps, as illustrated. This case is more difficult to process in many imaging systems.

One prior art imaging technique is disclosed in U.S. Pat. No. 5,808,626 to Givens et al. Tie points are selected within overlapping images, where the series of images are ordered to maximize the potential for successful phase correlation between adjacent images. Adjacent pairs in the ordered images are then phase correlated to determine translational offsets between adjacent pairs. The overlapping regions and adjacent pairs are assessed for normalized cross correlation and initial candidate tie points are selected within the regions at a reduced resolution. The initially selected tie points are then phase correlated at full resolution. Any surviving candidate tie point locations are further refined to sub-pixel accuracy.

This type of system provides an enhancement over many previous prior art techniques. It would be advantageous, however, if an image system's potential to identify "good" locations for tie point collection could be implemented while offering building-by-building or feature-by-feature occlusion. It is also desirable if the use of imagery for overlap analysis could provide more accurate depiction of overlap areas as compared to four corner point polygons.

SUMMARY OF THE INVENTION

The present invention is advantageous and provides an enhanced system and method that identifies tie point collections used in imagery where overlaps can be readily understood. Imagery context can still be available with the system and method of the invention. Building-by-building or feature-by-feature occlusion is also possible. The use of imagery for overlap analysis in the present invention provides a more accurate depiction of overlap areas, as compared to processing and interpreting four corner point polygons. The present invention uses combiners to provide an easily understood depiction of the number of overlapping images/pairs at a discrete geographic location or region. These combiners preserve important features through the combination process, such as cloud coverage.

In accordance with the present invention, the system identifies tie point collections used in imagery and includes at least one image collection device for acquiring images of a selected region. A processor is operatively connected to the at least one image collection device. In one aspect of the invention, the at least one processor combines the acquired images into respective stereo images, such that only the stereo overlap remains. In another aspect of the present invention, the system can alone or in combination overlap combine the respective stereo images and color code the overlapped image areas based on the number of overlapping stereo images, to produce a colored overlay image and assist in triangulation and optimal texture selection.

In yet another aspect of the present invention, each area has a different number of overlapping stereo images that are color coded with a different color. Those areas having a closer number of overlapping stereo images are color coded with a similar shade of color. The maximum intensity amongst overlapping pixels as defined within the reference coordinate system can be passed through to form the stereo image. Pairs of images are combined into respective stereo images. The images can comprise satellite images and aerial photographs, as known to those skilled in the art.

BRIEF DESCRIPTION OF THE DRAWINGS

Other objects, features and advantages of the present invention will become apparent from the detailed description of the invention which follows, when considered in light of the accompanying drawings.

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and is an improvement over prior art image acquisition and processing techniques for mapping and other applications, where traditional footprint polygons, such as shown in FIGS. 1 and 2, are used to identify the geographic extent of each individual image. The user or system processor working with this type of prior art image processing system is responsible for identifying the area of overlap. This could be simple in some cases, as shown in FIG. 1, where footprint 1 and footprint 2 overlap at overlap area 20. In more difficult and complex overlap conditions, as shown in FIG. 2, this is more difficult. As illustrated, footprints 1–6 overlap in various ways to form two-way, three-way and four-way overlap conditions.

As is well known, the identification of an area image overlap is critical to tie point collection used for the triangulation/registration/control of satellite or aerial imagery. Determining the areas of image overlap is geographically challenging and time consuming. The context of many image collections is complicated even more so when tie points must be generated between stereo overlap areas.

The present invention uses two different types of combiners illustrated at 22 and 24, which can work as single modules alone or in conjunction with each other. It is possible that the combiners can be implemented as software modules or as hardware device firmware, or embedded code. The combiners 22, 24 receive images from an image acquisition device 26 (FIGS. 3 and 4), such as a satellite imaging system, aircraft camera for terrestrial mapping, or other imaging device known to those skilled in the art. The device 26 acquires images from a selected surface region, such as a geographic region of the country. Images could also be acquired from other surfaces for medical imaging and other imaging applications known to those skilled in the art.

The combiners require simply that pixels from each of the input images can be projected or transformed to a common reference coordinate system. For example, in geodetic mapping systems, this might be done with geometry models using aircraft attitude data to project each image to the WGS84 ellipsoid. In that reference, space combination can occur. In medical, it may be a simple mapping to Cartesian three-dimensional space.

Figure 3:
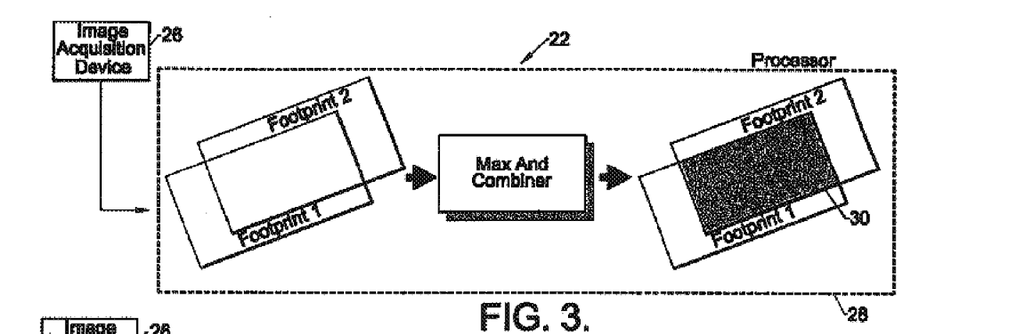
FIG. 3 is a diagram illustrating a first combiner for combining acquired images and forming stereo images, such that only the stereo overlap remains.

The first combiner 22 is illustrated in FIG. 3, and referred to as a "Max And" combiner that combines stereo pairs into a single overlap image with only the common overlap remaining, as shown by the shaded area at 30. As shown in FIG. 3, the image acquisition device or devices 26, such as a camera as part of an airplane or satellite, acquires a number of images. This is shown in the simplified example of FIG. 3, illustrating footprint 1 and footprint 2. These images are then processed by an image processor 28, as part of a computer known to those skilled in the art. The combiner 22 can be a software module and combine the acquired images into respective stereo images such that only the stereo overlap remains, as shown by the shaded overlap area 30 of FIG. 3. The maximum intensity amongst overlapping pixels, such as bright spots, are passed through to form the stereo image. Thus, dark areas can be ignored. This would allow for the processing of the brightest pixels and the location determination and identification of clouds and other assorted image objects common in imagery of this type. This is a particularly common problem in satellite photographs.

Figure 4:
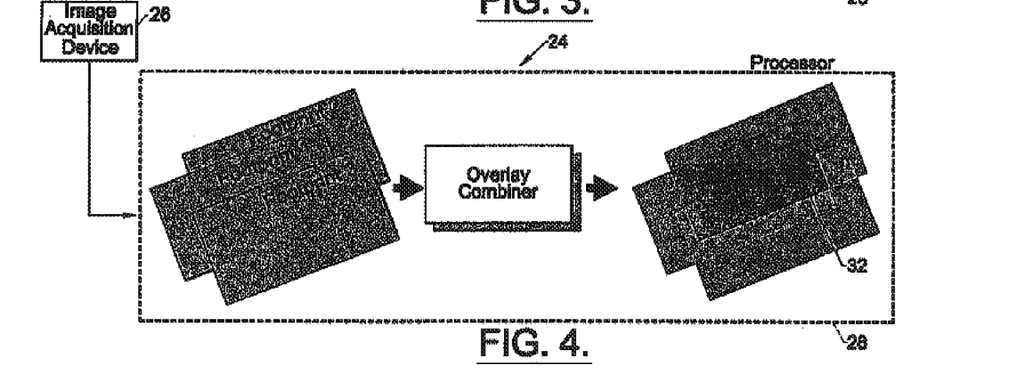
FIG. 4 is a diagram illustrating a second combiner where image footprints are overlap combined to produce a colored, overlay image.
Figure 6:
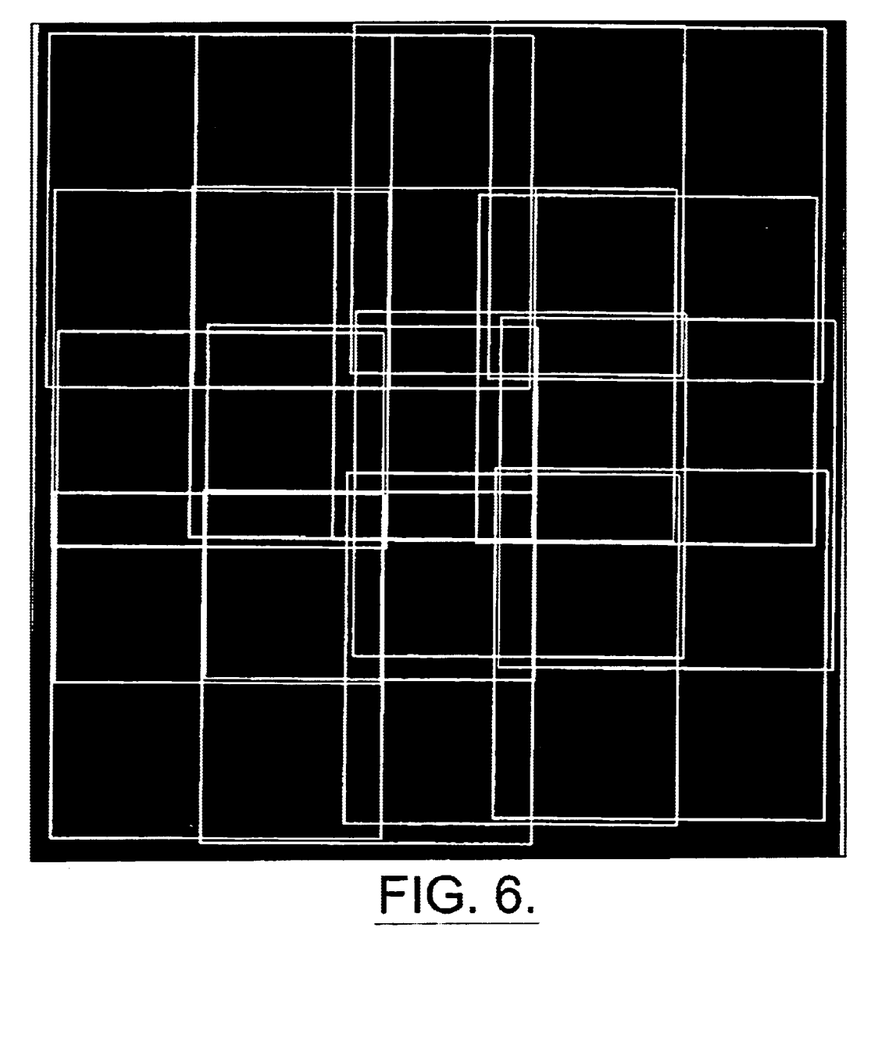
FIG. 6 illustrates a drawing of the traditional polygon overlap of the image shown in FIG. 5.
Figure 7:
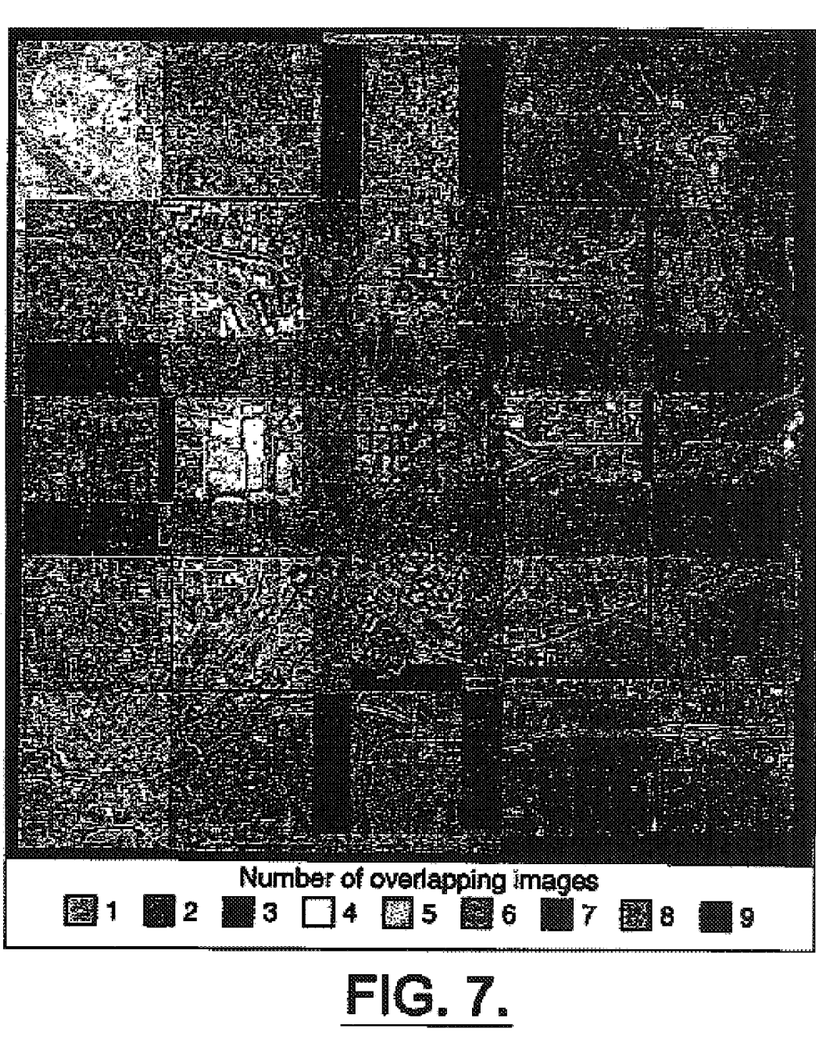
FIG. 7 illustrates an image of the region shown in FIG. 5 resulting from the color overlay combiner.

In the second combiner 24, various footprint images as shown by footprints 1, 2 and 3 are overlay combined to form overlap image areas 32 that are color coded to produce a colored overlay image to assist in triangulation and optimal texture selection. Any number of input sources can be used. The outputs are color coded based on the number of overlapping inputs. For example, as shown in FIG. 4, dark green represents an area of three-way overlap, and light green represents an area of two-way overlap. Those areas having close numbers of overlap images can be color coded with a similar shade of color, as shown in FIG. 7, where nine different colors form the overlap areas. The block diagram of FIG. 6 shows an uncolored geometric representation of the overlap for the images. For example, as noted before, the area of three-way overlap could be dark green, and the area of two-way overlap could be light green, which are similar in shade and only one overlap in number apart.

Figure 5:
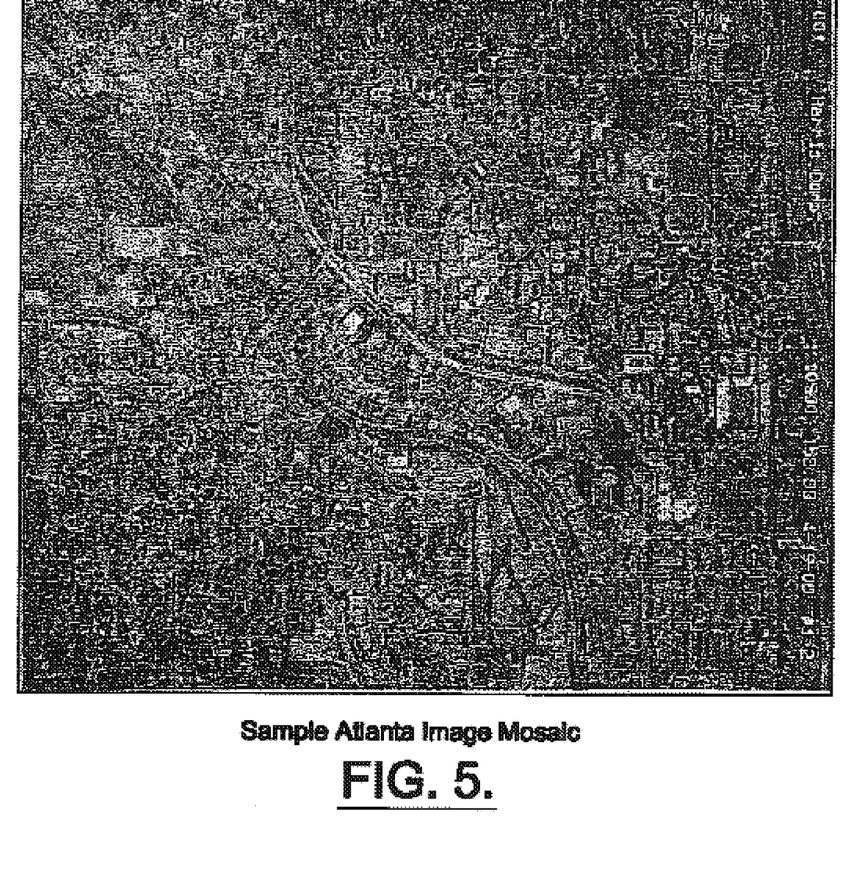
FIG. 5 illustrates a sample image mosaic for the region around Atlanta, Ga.
Figure 8:
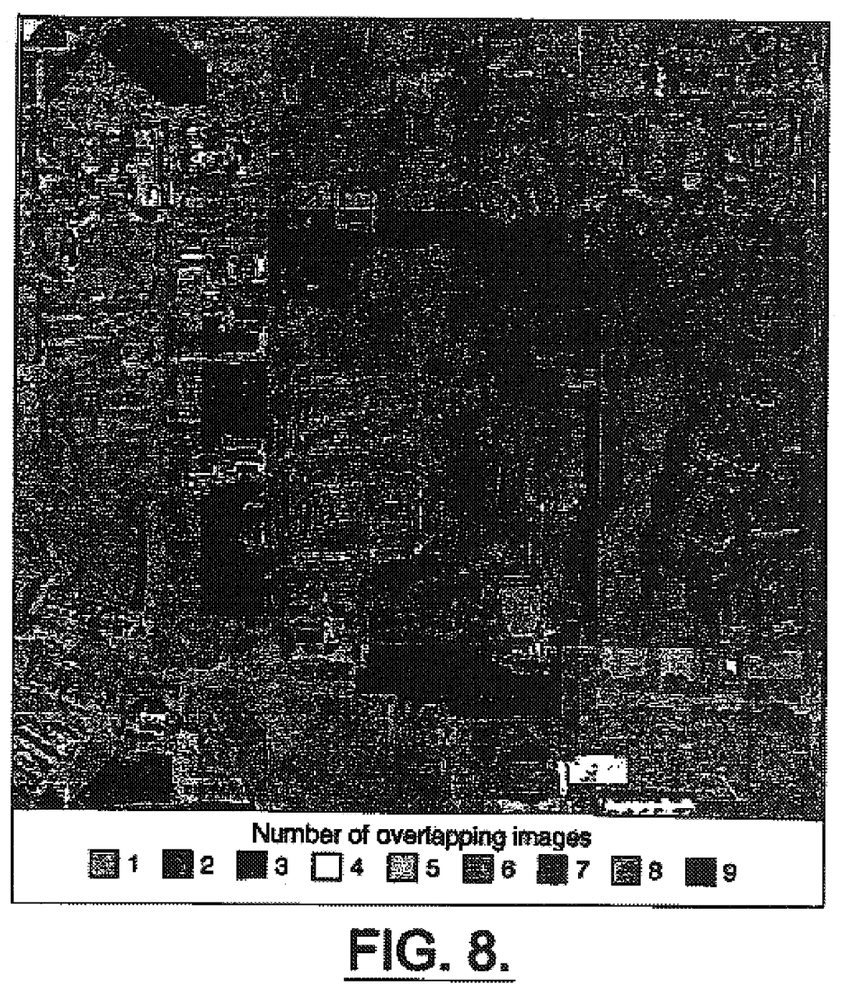
FIG. 8 is another image of the view of FIG. 5, and showing that building-by-building or feature-by-feature occlusion is possible, subject to constraints of a high quality, independent ortho-rectification engine.

FIG. 5 illustrates a sample Atlanta image mosaic, which is shown in FIG. 7 as a colored overlay image that assists in triangulation and optimal texture selection. With the coloration scheme of the present invention, overlaps can be readily understood and the understanding of the image and mapping situation is improved. Imagery context is still available. Although there could be slower execution and there is a requirement of color vision and familiarity to interpret colors, the benefits are manifest. As shown in FIG. 8, it is possible to have a building-by-building or feature-by-feature occlusion.

Figure 9:
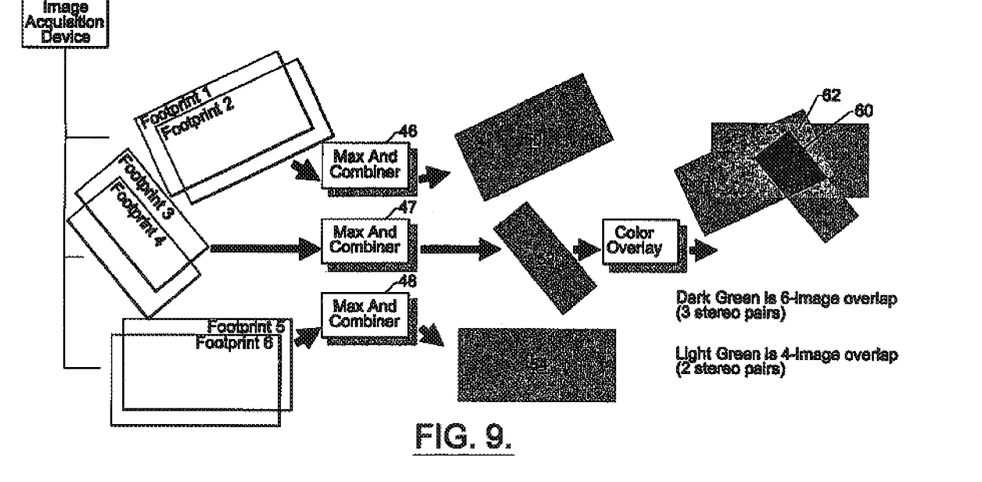
FIG. 9 is a more detailed diagram showing how the two combining processes can cooperate.

It is also possible for both combiners 22,24 to work in conjunction with each other. The first "Max And" combiner can be used to form a stereo overlap coverage, while a color overlay combiner can be used to show the number of overlapping stereo pairs as shown in FIG. 9. Images shown as footprints 1 and 2, footprints 3 and 4, and footprints 5 and 6 are first combined into respective stereo images 50, 52 and 54 by three separate "Max And" combiner modules 46, 47 and 48, such that only the stereo overlap remains. The respective stereo images 50, 52 and 54 can then be combined and color coded. A dark green color shown at 60 is a six-image overlap with three stereo pairs and a light green color shown at 62 is a four-image overlap with two stereo pairs.

The use of imagery overlap analysis provides a more accurate depiction of the overlap areas as compared to four corner point polygons. The use of the two combiners as explained above provides an easily understood depiction with the number of overlapping images and pairs at a discrete geographic location. These combiners can preserve important features, such as cloud coverage, through the combination process. This is especially relevant for triangulation/control software that could be used with one-meter resolution satellites as they become available. It is particularly useful during analyst review of automatic tie-point generation to ensure tie-point distribution meets all applicable specifications.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for identifying tie point collections used in imagery comprising:
   at least one image collection device for acquiring images of a selected surface region; and
   a processor operatively connected to the at least one image collection device for
   a) combining the acquired images into respective stereo images such that only the stereo overlap remains, b) overlay combining the respective stereo images, and c) color coding the overlapped image areas based on the number of overlapping images to produce a colored overlay image to assist in triangulation and optimal texture selection.

2. A system according to claim 1, wherein each area having a different number of overlapping stereo images are color coded with a different color.

3. A system according to claim 2, wherein those areas having close numbers of overlapped stereo images are color coded with a similar shade of color.

4. A system according to claim 1, wherein the maximum intensity amongst overlapping pixels are passed through to form the stereo image.

5. A system according to claim 1, wherein pairs of images are combined into respective stereo images.

6. A system according to claim 1, wherein said images comprise satellite images.

7. A system according to claim 1, wherein said images comprise aerial photographs or images.

8. A system for identifying tie point collections used in imagery comprising:

at least one image collection device for acquiring images of a selected surface region; and a processor operatively connected to the at least one image collection device for overlay combining the images and color coding the overlapped image areas based on the number of overlapping images to produce a colored overlay image to assist in triangulation and optimal texture selection.

9. A system according to clam 8, wherein each area having a different number of overlapping images are color coded with a different color.

10. A system according to claim 9, wherein those areas having close numbers of overlapping images are color coded with a similar shade of color.

11. A system according to claim 8, wherein said processor combines the acquired images into respective stereo images such that only the stereo overlap remains.

12. A system according to claim 11, wherein the maximum intensity amongst overlapping pixels are passed through to form the stereo images.

13. A system according to claim 11, wherein pairs of images are combined into respective stereo images.

14. A system according to claim 8, wherein said images comprise satellite images.

15. A system according to claim 8, wherein said images comprise aerial photographs or images.

16. A system for identifying tie point collections used in imagery comprising:

at least one image collection device for acquiring images of a selected surface region; and a processor operatively connected to the at least one image collection device for combining images into respective stereo images such that only the stereo overlap remains.

17. A system according to claim 16, wherein said system overlay combines the respective stereo images and color codes the overlapped image areas based on the number of overlapping stereo images to produce a colored overlay image to assist in triangulation and optimal texture selection.

18. A system according to claim 17, wherein each area having a different number of overlapping stereo images are color coded with a different color.

19. A system according to claim 18, wherein those areas having close numbers of overlapped stereo images are color coded with a similar shade of color.

20. A system according to claim 16, wherein the maximum intensity amongst overlapping pixels are passed through to form the stereo image.

21. A system according to claim 16, wherein pairs of images are combined into respective stereo images.

22. A system according to claim 16, wherein said images comprise satellite images.

23. A system according to claim 16, wherein said images comprise aerial photographs or images.

24. A method of identifying tie point collections used in imagery comprising the steps of:

combining images into respective stereo images such that only the stereo overlap remains;

overlay combining the respective stereo images; and color coding the overlapped image areas based on the number of overlapping stereo images to produce a colored overlay image to assist in triangulation and optimal texture selection.

25. A method according to claim 24, and further comprising the step of color coding each area having a different number of overlapping stereo images.

26. A method according to claim 24, and further comprising the step of selecting similar shades of color for those areas having close numbers of overlapped stereo images.

27. A method according to claim 24, and further comprising the step of passing through the maximum intensity amongst overlapping pixels to form the stereo image.

28. A method according to claim 24, and further comprising the step of combining pairs of images into respective stereo images.

29. A method according to claim 24, wherein said images comprise satellite images.

30. A method according to claim 24, wherein said images comprise aerial photographs or images.

31. A method of identifying tie point collections used in imagery comprising the steps of:

acquiring a plurality of images of a selected surface region;

combining a plurality of images into a single overlay image having a plurality of overlapped image areas corresponding to different number of overlapping images; and color coding with a different color the overlapped image areas based on the number of overlapping images in each overlapped image areas.

32. A method according to claim 31, wherein said images comprise satellite images.

33. A method according to claim 31, wherein said images comprise aerial photographs or images.

34. A method according to claim 31, and further comprising the step of selecting similar shades of color for those overlapping images having close numbers of overlapping images.

35. A method according to claim 31, and further comprising the step of combining pairs of images to form respective images.

36. A method according to claim 31, and further comprising the step of combining the acquired images into stereo images while passing through the maximum intensity amongst overlapping pixels to form the stereo image.

37. A method of identifying tie point collections used in imagery comprising the steps of:

acquiring a plurality of images of a selected surface region; and combining the images into respective stereo images such that only the stereo overlap remains.

38. A method according to claim 37, and further comprising the step of passing through any maximum intensity pixels to form the stereo image.

39. A method according to claim 37, and further comprising the step of combining pairs of images into respective stereo images.

40. A method according to claim 37, wherein said images comprise satellite images.

41. A method according to claim 37, wherein said images comprise aerial photographs or images.

42. A method according to claim 37, and further comprising the steps of overlay combining the respective stereo images; and color coding the overlapped image areas based on the number of overlapping stereo images to produce a colored overlay image to assist in triangulation and optimal texture selection.

43. A method according to claim 37, and further comprising the step of color coding each area having a different number of overlapping stereo images with a different number.

44. A method according to claim 37, and further comprising the step of selecting similar shades of color for those areas having close numbers of overlapping stereo images.

* * * * *